Patented Feb. 18, 1930

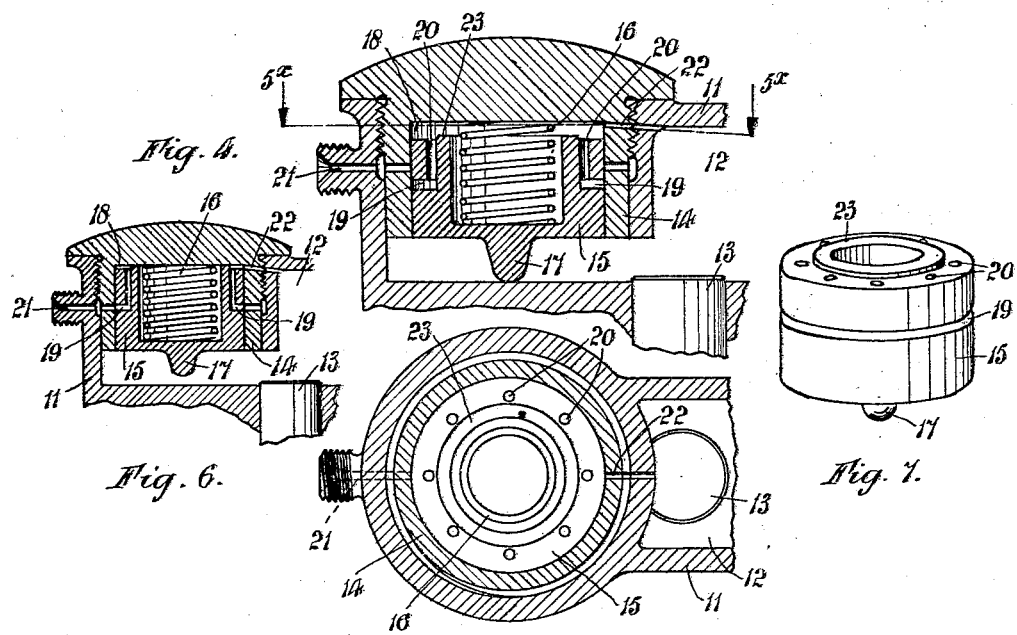
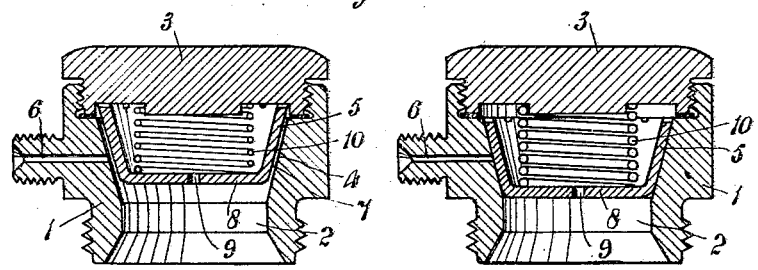
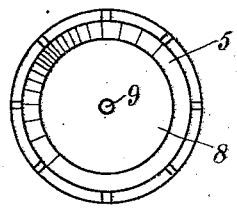

1,747,456

UNITED STATES PATENT OFFICE

WARREN NOBLE, OF DETROIT, MICHIGAN

AIR-BLEEDER VALVE

Application filed March 10, 1927. Serial No. 174,297.

This invention has reference to the bleeding of air from hydraulic systems wherein this is desirable and in many cases imperative, such as in hydraulic valve gears whereby in a valve is operated through the medium of a column of oil.

Many attempts to cope with the problem of getting rid of air accumulation in a hydraulic system have been unsuccessful because of the introduction of human or mechanical factors, not completely and automatically responsive to variation of pressure or speed of air accumulation to the extent necessary for adequate air elimination under extreme conditions of operation and the rigid requirements such as are met with in systems which must be highly efficient under all conditions, as in the case of high speed engines employing hydraulic valve operating means.

The use of floats, as commonly understood, is not in many cases feasible or reliable, and an object of this invention is to dispense with float valves which depend for operation upon a difference in intrinsic buoyancy between a float and the hydraulic fluid for their operation, and to provide a valve which operates on an entirely different principle involving the difference between pressures, on opposite sides of a wall, of a compressible fluid passing through an opening therein. A further object is to provide a simple valve adapted to be unseated by differential pressure resulting from the aforesaid conditions and to thereby permit the escape of the compressible fluid through a provided outlet. Also the invention provides for the re-seating of said valve by virtue of a balancing of pressure, resulting from the admission of an incompressible fluid to both sides of said valve as said compressible fluid is exhausted through the disclosed outlet.

Still further objects or advantages subsidiary or incidental to the aforesaid objects, or resulting from the construction or operation of the invention as it may be carried into effect, will become apparent as the said invention is hereinafter further disclosed.

In carrying the invention into effect, I may provide a hydraulic system with an air bleeder passage located at an advantageous point in said system, said passage having an air outlet leading therefrom, and a valve proximate to the end of said passage and normally seating to close said outlet, said valve being cup shaped with its sides seated in the walls of said passage and its concave face disposed towards the end of said passage. A restricted orifice is provided in the central portion of said valve through which air or hydraulic fluid may pass to the concave side of said valve according to the effective presence or absence of air in the system, and the valve operated to disclose said outlet according to the differential in compression or pressure of air on opposite sides of said valve. All of which is more particularly described and ascertained hereinafter, by way of example, having reference to the accompanying drawing, wherein:—

Figure 1 is a sectional view of an air bleeder valve device embodying the said invention;

Figure 2 is a similar view with the valve in its open position;

Figure 3 is a detail plan of the valve;

Figure 4 is a fragmentary sectional elevation of a valve actuator head embodying the said invention and illustrating a modified form of air valve;

Figure 5 is a section through the same taken on the line 5×—5× of Figure 4;

Figure 6 is a similar view to Figure 4, on a somewhat smaller scale, the valve being shown in its air bleeding position; and Figure 7 is a perspective detail view of the valve of Figures 4, 5 and 6.

Similar characters of reference indicate similar parts in the several figures of the drawings.

Referring to Figures 1, 2 and 3: 1 is a bleeder pipe or casing having a passage 2 therein closed at its end by a cap 3; the said passage being flared towards its end to provide a conical seat 4 for a valve generally numbered 5. 6 is an air outlet port leading from the said seat 4.

The valve may be of sheet metal formed to a cup shape with its side wall 7 shaped to fit the seat 4 of the passage 2. The base 8 of the said valve is provided with a restricted orifice 9 or walled passage therethrough and forms a diaphragm across the said passage 2, the concave side of the valve being presented towards the cap 3.

The operation of the device will be readily apparent from a comparison of Figures 1 and 2 of the drawing. Assuming a quantity of air to be trapped in the passage 2, as indicated in Figure 1, the pressure of the column of oil or other hydraulic fluid $b$ on such air causes a flow of air through the orifice 9 of the valve 4 into the flared end of the passage 2, and as said flow of air is consequent upon a higher pressure on the underside of the valve, this pressure serves to raise the valve from its seat, thus permitting the escape of air around the unsealed wall of said valve through the outlet 6. 10 is a spring which may be employed to ensure the normal seating of the valve when the air is expelled from above the valve by the described flow, the pressure above the valve increases to an extent reducing the differential until the spring 10 operates to again close the valve on its seat, and the valve remains so seated until a sufficient amount of air has accumulated above or about the valve to permit the aforesaid bleeding action.

A very satisfactory form and application of the device is illustrated in Figures 4, 5, 6 and 7, wherein provision is made for the bleeding of air from the actuator head of a hydraulically operated valve, 11 being the actuator head which is hollow to provide a fluid chamber 12; and 13 indicates the upper end of the valve stem which is adapted to be actuated by hydraulic fluid under intermittent pressure in the said chamber 12.

Inserted in this chamber is a cap or valve casing 14, the lower end of which terminates short of the lower wall of the fluid chamber 12 whereby fluid access from the said chamber is permitted to the underside of valve 15, which is vertically movable within the said valve casing 14. This valve is depressed by a valve spring 16 and limited in its downward movement by a stop 17 to ensure free access of hydraulic fluid to the underside of the valve at all times. The said valve is spaced from the upper end of the valve casing 14 to provide an air chamber 18 and is annularly ported at 19 and further provided with passages 20 extending upwardly from the annular port to the upper face of the valve to provide communication between the air chamber 18 and the said annular port 19.

21 is an air outlet passage through the side wall of the valve casing 14 and the side wall of the actuator head, this outlet being above the normal level of the annular valve port 19 which is in such relationship thereto that the lifting of the valve to a sufficient extent will cause the said port 19 to register with the said outlet 21. The valve casing 14 is also provided, adjacent the upper wall of the actuator head, with a restricted port 22 communicating with the air chamber 18, so that air accumulating in the upper part of the valve actuator chamber 12 may gain access to the said air chamber 18.

Thus, it is possible to have a condition upon such accumulation of air in the valve actuator chamber that a compressible fluid, namely: air, may exist above the valve 15, with an incompressible fluid below the said valve, the latter being under pressure adapted to overcome whatever pressure the compressible fluid in the air chamber 18 may be already subjected to, with the consequence that the valve is lifted against the resistance of the valve spring 16 and the passages 19 and 21 brought into juxtaposition. The air is thereby released from the said air chamber 18, partly as a result of the expansion of the air within the chamber 18 upon the opening of the outlet ports 19 and 21 and partly as a result of flow from the actuator chamber 12 through the port 22 to the air chamber 18 and thence through the ports 20, 19 and 21.

The central part of the valve is provided with an upwardly extending boss 23 which limits the upward movement of the valve within its casing and ensures communication being uninterrupted between the air chamber 18 and the passage 22 when the valve is fully raised, so that, in such raised position of the valve, air may continue to pass from the actuator chamber 12 to the air chamber 18 of the valve casing to permit the required exhausting of air from the actuator chamber. It will be readily understood that such exhausting of air is desirable in order to obtain the positive movement of the valve stem 13 by fluid in the actuator head, which movement would be otherwise cushioned by the presence of air in the actuator chamber, especially when the valve operates against high pressures such as obtain in internal combustion engine practice.

Upon exhausting the air from the air chamber 18, in the manner described, by the incompressible fluid, and the eventual access of such incompressible fluid to the air chamber 18 a more or less balanced fluid pressure on the valve is obtained which permits the valve spring 16 to react and depress the valve to its normal position in which the outlet port 21 is again closed.

Re-accumulation of air in the chamber of the actuator head as a result of fluid displacement by counterflow of air and hydraulic fluid through the port 22 will result in the described cycle of operations being resumed.

It should be understood that the term "compressible fluid" is not necessarily restricted to air or gaseous fluid alone as an aerated fluid, such as oil charged with air, would also be compressible, this compressible characteristic increasing with the proportion of air mixed therewith. Thus for the operation of the valve hereinbefore described, it is not necessary that the air chamber which shall be entirely free from incompressible fluid as it may contain a normally incompressible fluid, such as oil, sufficiently charged with air to provide the differential pressure required to establish flow through the ports in the manner already described, and permit movement of the valve for the relief of air or air charged oil until the required elimination of air has taken place.

This invention may be developed within the scope of the following claims without departing from the essential features of the said invention, and it is desired that the specifications and drawings be read as being merely illustrative and not in a limiting sense, except as necessitated by the prior art.

What I claim is:—

1. In a device of the class described, a hollow casing, a ported valve therein forming a partition in said casing whereby two chambers having restricted intercommunication are provided, said casing having an inlet port on one side of said valve and an outlet port normally closed by said valve, and means yieldably pressing said valve towards the inlet end of said casing, said means having such resistance that it may be overcome by differential pressure resulting from accumulation of air on the outlet side of said valve, to disclose said outlet, said means returning said valve to its outlet closing position upon access of incompressible fluid to said last mentioned chamber to an extent neutralizing the said differential pressure sufficiently to permit such means to react.

2. In a device of the class described, a chambered casing having an outlet therefrom and an inlet thereto, a valve normally closing said outlet, said valve partitioning the chamber of said casing, said device being ported to afford substantially restricted communication between the chamber on opposite sides of said valve and the sole communication therebetween, and means yieldably maintaining said valve in its outlet closing position.

3. In an air bleed valve for a hydraulic system, a hollow casing, a slidable partition in said casing forming chambers on each side thereof, a passageway establishing constant communication between said chambers and forming an inlet for one of said chambers, an outlet from said latter chamber, the upper of said chambers having a region of air accumulation therein, and a passageway from said region of air accumulation to said outlet, said partition normally closing said outlet, said partition being adapted to establish communication between said region of air accumulation and said outlet under differential pressures in said chambers.

4. In an air bleed valve for a hydraulic system, a hollow casing having a region of air accumulation, a slidable partition having upstanding walls in said casing defining an upper and lower chamber, a passageway establishing constant communication between said chambers and forming an inlet for said upper chambers, an outlet from said upper chamber normally closed by said partition, passages extending thru the walls of said partition communicating with said region of air accumulation, displacement of said partition under differential pressures uncovering said passages to said outlet, whereby air is bled from said casing.

5. In an air bleed valve for a hydraulic system, a hollow casing located at the top of said system and having a hollow plunger having radial passages extending from the surface thereof a substantial distance inwardly thereof, and a second passage extending from each of said radial passages longitudinally to the outer end thereof and to said region of air accumulation, an inlet passage for said casing from said system and an outlet passage from said casing, said plunger normally closing said outlet passage, said plunger aligning said outlet passage and said radial passages under differential pressure between said system and said casing due to air accumulation in said casing, whereby air is bled from said casing.

6. In an air bleed valve for hydraulic systems, a hollow casing having a region of air accumulation, a slidable partition having upstanding walls and arranged in said casing to define an upper and lower chamber, a passageway establishing constant communication between said chambers and forming an inlet for said upper chamber, an outlet from said upper chamber normally closed by said partition, yieldable means for retaining said partition in normal position, passages extending thru the walls of said partition communicating with said region of air accumulation, displacement of said partition under differential pressures uncovering said passages to said outlet, whereby air is bled from said casing.

In testimony whereof I affix my signature.

WARREN NOBLE.